United States Patent
Yamasaki (10) Patent No.: US 8,020,169 B2
(45) Date of Patent: Sep. 13, 2011

(54) CONTEXT SWITCHING SYSTEM HAVING CONTEXT CACHE AND A REGISTER FILE FOR THE SAVE AND RESTORE CONTEXT OPERATION

(75) Inventor: Nobuyuki Yamasaki, Kanagawa (JP)

(73) Assignee: Japan Science and Technology Agency, Saitama (JP)

( * ) Notice: Subject to any disclaimer, the term of this patent is extended or adjusted under 35 U.S.C. 154(b) by 1361 days.

(21) Appl. No.: 10/541,187

(22) PCT Filed: Dec. 11, 2003

(86) PCT No.: PCT/JP03/15838
§ 371 (c)(1),
(2), (4) Date: Aug. 21, 2006

(87) PCT Pub. No.: WO2004/063925
PCT Pub. Date: Jul. 29, 2004

(65) Prior Publication Data
US 2007/0022428 A1    Jan. 25, 2007

(30) Foreign Application Priority Data
Jan. 9, 2003  (JP) .................................. 2003-003038

(51) Int. Cl.
G08F 9/46   (2006.01)
G06F 7/38   (2006.01)
(52) U.S. Cl. .......................... 718/108; 718/102; 712/228
(58) Field of Classification Search .................. None
See application file for complete search history.

(56) References Cited

U.S. PATENT DOCUMENTS
5,892,944 A * 4/1999 Fukumoto et al. ............ 718/100
6,018,759 A * 1/2000 Doing et al. .................. 718/108
(Continued)

FOREIGN PATENT DOCUMENTS
EP      0942365     9/1999
(Continued)

OTHER PUBLICATIONS
Guangzuo, C. et. al, Parallel Replacement Mechanism for MultiThread, Advances in Parallel and Distrubuted Computing 1997 Proceedings, 1997, pp. 338 to 334.

(Continued)

Primary Examiner — Meng A An
Assistant Examiner — Tammy Lee
(74) Attorney, Agent, or Firm — Lowe Hauptman Ham & Berner, LLP (57) ABSTRACT

In an application in which context switching often occurs such as in a real time OS, it is possible to significantly reduce the overhead caused by the context switching. The OS issues a Swap instruction and a context switch starts. The Swap instruction is issued together with a thread (i.e., context) ID to be replaced, to a thread control unit (9). The thread ID is used to uniquely identify threads stored in a context cache (8). The thread control unit (9) saves data from a register file (1) to the context cache (8) via a context-dedicated bus (12) and transmits data of a new thread from the context cache (8) to the register file (1). According to the thread ID received, the thread control unit (9) automatically interchanges the necessary number of data in the register file (1) and the data in the context cache (8).

13 Claims, 8 Drawing Sheets

U.S. PATENT DOCUMENTS

| | | | | |
|---|---|---|---|---|
| 6,076,157 | A * | 6/2000 | Borkenhagen et al. | 712/228 |
| 6,205,467 | B1 * | 3/2001 | Lambrecht et al. | 718/108 |
| 6,233,599 | B1 * | 5/2001 | Nation et al. | 718/102 |
| 6,351,808 | B1 * | 2/2002 | Joy et al. | 712/228 |
| 6,401,155 | B1 | 6/2002 | Saville et al. | |
| 6,408,325 | B1 * | 6/2002 | Shaylor | 718/108 |
| 6,526,491 | B2 * | 2/2003 | Suzuoki et al. | 711/164 |

FOREIGN PATENT DOCUMENTS

| | | |
|---|---|---|
| EP | 1233340 | 8/2002 |
| JP | 03-009431 | 1/1991 |
| JP | 3-9431 A | 1/1991 |
| JP | 06-083639 | 3/1994 |
| JP | 07-141208 | 6/1995 |
| JP | 09-212371 | 8/1997 |
| JP | 10-011301 | 1/1998 |
| JP | 10-063517 | 3/1998 |
| JP | 11-039171 | 2/1999 |
| JP | 10-11301 A | 3/2000 |
| JP | 2000-076079 | 3/2000 |
| JP | 2000-76079 A | 3/2000 |
| JP | 2000-242505 | 9/2000 |
| JP | 2000-242505 A | 9/2000 |
| JP | 2002-513182 A | 5/2002 |
| JP | 2002-513182 | 8/2002 |
| JP | 2002-533807 | 10/2002 |
| WO | WO 02/069150 | 9/2002 |

OTHER PUBLICATIONS

Wills, D.S. et al., Pica: An Ultra-Light Processor for High-Troughput Application, Computer Design: VLSI in Computers and Processors, 1993. ICCD '93. Proceedings, 1993, pp. 410 to 114.

Kwak, H. et al., Effects of multithreading on cache performance, computers, IEEE Transactions on, 1999, pp. 176 to 184.

Guangzuo, C. et. al, Parallel Replacement Mechanism for MultiThread, Advances in Parallel and Distrubuted Computing 1997 Proceedings, 1997, pp. 338 to 334; particularly, pp. 340.

Wills, D.S. et al., Pica: An Ultra-Light Processor for High-Troughput Application, Computer Design: VLSI in Computers and Processors, 1993. ICCD '93. Proceedings, 1993, pp. 410 to 414; particularly, pp. 411 to 412.

* cited by examiner

CONTEXT SWITCHING SYSTEM HAVING CONTEXT CACHE AND A REGISTER FILE FOR THE SAVE AND RESTORE CONTEXT OPERATION

CROSS REFERENCE TO RELATED APPLICATIONS

The present Application is based on International Application No. PCT/JP2003/015838, filed on Dec. 11, 2003, which in turn corresponds to JP 2003-3038 filed on Sep. 1, 2003, and priority is hereby claimed under 35 USC §119 based on these applications. Each of these applications are hereby incorporated by reference in their entirety into the present application.

TECHNICAL FIELD

The present invention relates to context switching methods, context switching units, central processing units, context switching programs, and computer-readable storage media having stored the programs, and more specifically, to a context switching method, a context switching unit, a central processing unit, a context switching program, and a computer-readable storage medium having stored the program that allow overhead caused by context switching in an operating system (OS) such as a real-time operating system (RTOS) to be reduced. Context here means current execution statuses or information for executing each thread stored in a storage portion (such as a register file), including a general-purpose register, a floating-point register, a program counter, a status register, and others.

BACKGROUND ART

Figure 8:
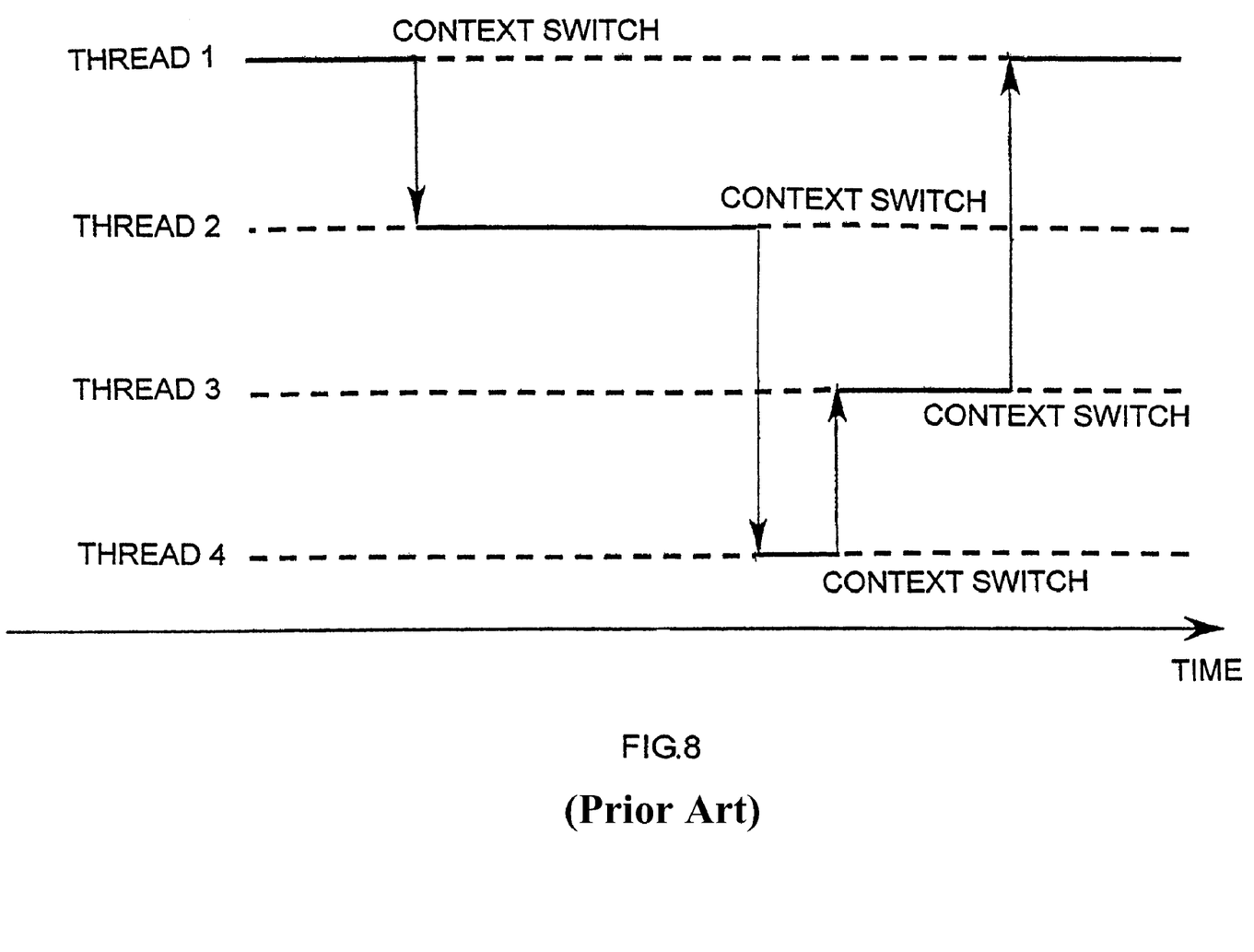
FIG. 8 is a diagram showing a context switch operation.

FIG. 8 is a diagram showing a context switch operation.

This figure shows an example in which a plurality of contexts (threads) are switched and executed by a single central processing unit. When a context is switched, the statuses of the current context (a general-purpose register, a floating-point register, a program counter, a status register, and others, and hereafter simply referred to as a context) must be saved, and the statuses of a new context must be read out. The time required for the switch operation is referred to as overhead, and the overhead occurs each time a context is switched.

Some of the conventional techniques for reducing the context switching time are described in the following documents.

Patent Document 1 (Japanese Unexamined Patent Application Publication No. Hei-07-141208) describes a technique for reducing a dispatch time in a multitasking apparatus using a real-time operating system, by providing a plurality of register banks occupied by tasks and by switching the register bank to save and restore the context and others.

Patent Document 2 (Japanese Unexamined Patent Application Publication No. Hei-09-212371) describes a register save and restore system for reducing the overhead of an OS by providing a bit indicating whether the contents of each corresponding register have changed or not in a multitasking microprocessor and, when a task switch occurs, executing a save instruction if the contents of the register have been changed or not executing a save instruction if the contents of the register have not changed, in accordance with the bit.

DISCLOSURE OF INVENTION

In the conventional methods, when a context is switched, each context status held in the central processing unit is stored in a storage unit outside the central processing unit by means of a store instruction of software such as an OS. Then, the software, such as an OS, reads a new context from the storage unit by means of a load instruction. Each time a context is switched, large overhead occurs because several hundreds to one thousand and several hundreds of memory access cycles occur to store the context and read another context. The conventional methods read and store context by means of a load instruction and a store instruction of software, so that just one data item can be handled each time. Therefore, as the number of statuses to be stored increases, the context switching time increases.

An object of the present invention is to reduce overhead caused by context switching significantly, especially in an application, such as a real-time OS, involving frequent context switching. Another object of the present invention is to provide such a context switching method and a context switching unit, a central processing unit, a context switching program, and a computer-readable storage medium having stored the program that enable a context to be stored and another context to be read by one or several memory access cycles each time a context switch occurs.

A further object of the present invention is to keep the context switching time constant and to minimize the time quantum of the real-time operation, especially in a system involving frequent context switching such as a real-time processing system.

The present invention reduces overhead resulting from context switching by

1. Providing a special storage unit (context cache) for holding a context, and
2. Connecting the special storage unit (context cache) and the central processing unit (CPU) by a special bus wider in bit width than a register.

According to a first solving means of the present invention, there is provided a context switching unit for switching a plurality of contexts, the context switching unit comprising:

a register file having stored a context related to a thread to be executed by an arithmetic logic unit or a memory access unit;

a context cache for caching a context, the context cache being connected to the register file;

a context switching bus for connecting the register file and the context cache; and a thread control unit for controlling data transmission between the context cache and the register file, the thread control unit comprising a thread identifier table for storing a thread identifier for identifying a thread context stored in the context cache and being connected in parallel with the arithmetic logic unit and the memory access unit, wherein, when a context switch occurs, the thread control unit searches through the thread identifier table in accordance with an input switch instruction and a new thread identifier to be interchanged;

obtains the address where a new context to be interchanged is stored in the context cache and the register identifier indicating the location where the current context is stored in the register file; and accesses the context cache in accordance with the obtained address and accesses the register file in accordance with the obtained register identifier, and interchanges or saves or restores the context in the register file and/or the context cache through the context switching bus.

According to a second solving means of the present invention, there is provided a central processing unit, the central processing unit including the above-described context switching unit, an instruction cache for caching an instruction and a data cache for caching data;

an instruction fetch unit for fetching an instruction from the instruction cache and decoding the instruction;

an arithmetic logic unit for performing an operation in accordance with an instruction stored in the register file and writing the result of the operation back in the register file;

a memory access unit for receiving an operand and an instruction from the register file, accessing the data cache, and executing a load or store operation; and an arithmetic bus for connecting the register file, the arithmetic logic unit, the memory access unit, and the thread control unit in parallel.

According to a third solving means of the present invention, there is provided a context switching method for switching a plurality of contexts by using a context switching unit comprising:

a register file having stored a context related to a thread to be executed by an arithmetic logic unit or a memory access unit;

a context cache for caching a context, the context cache being connected to the register file; and a context switching bus for connecting the register file and the context cache, the context switching method comprising:

searching through a thread identifier table for storing a thread identifier for identifying the context of a thread stored in the context cache, in accordance with an input switch instruction and the identifier of a new thread to be interchanged, when a context switch occurs;

obtaining the address where a new context to be interchanged is stored in the context cache and a register identifier indicating the location where the current context is stored in the register file;

accessing the context cache in accordance with the obtained address and accessing the register file in accordance with the obtained register identifier, and interchanging or saving or restoring the context of the register file and/or the context cache through the context switching bus.

According to a fourth solving means of the present invention, there is provided a context switching program for switching a plurality of contexts on a computer by using a context switching unit, and a computer-readable recording medium having recorded the program comprising:

a register file having stored a context related to a thread to be executed by an arithmetic logic unit or a memory access unit;

a context cache for caching a context, the context cache being connected to the register file; and a context switching bus for connecting the register file and the context cache, the context switching program for letting the computer execute:

a step of searching through a thread identifier table for storing a thread identifier for identifying the context of a thread stored in the context cache, in accordance with an input switch instruction and the identifier of a new thread to be interchanged, when a context switch occurs;

a step of obtaining the address where a new context to be interchanged is stored in the context cache and a register identifier indicating the location where the current context is stored in the register file;

a step of accessing the context cache in accordance with the obtained address and accessing the register file in accordance with the obtained register identifier, and interchanging or saving or restoring the context of the register file and/or the context cache through the context switching bus.

DESCRIPTION OF THE PREFERRED EMBODIMENTS

1. Related Art

The present embodiment is used, for instance, as a context cache on the central processing unit of a responsive multi-threaded (RMT) processor for distributed real-time parallel control. A computer including the CPU related to the present embodiment will be described first.

Figure 1:
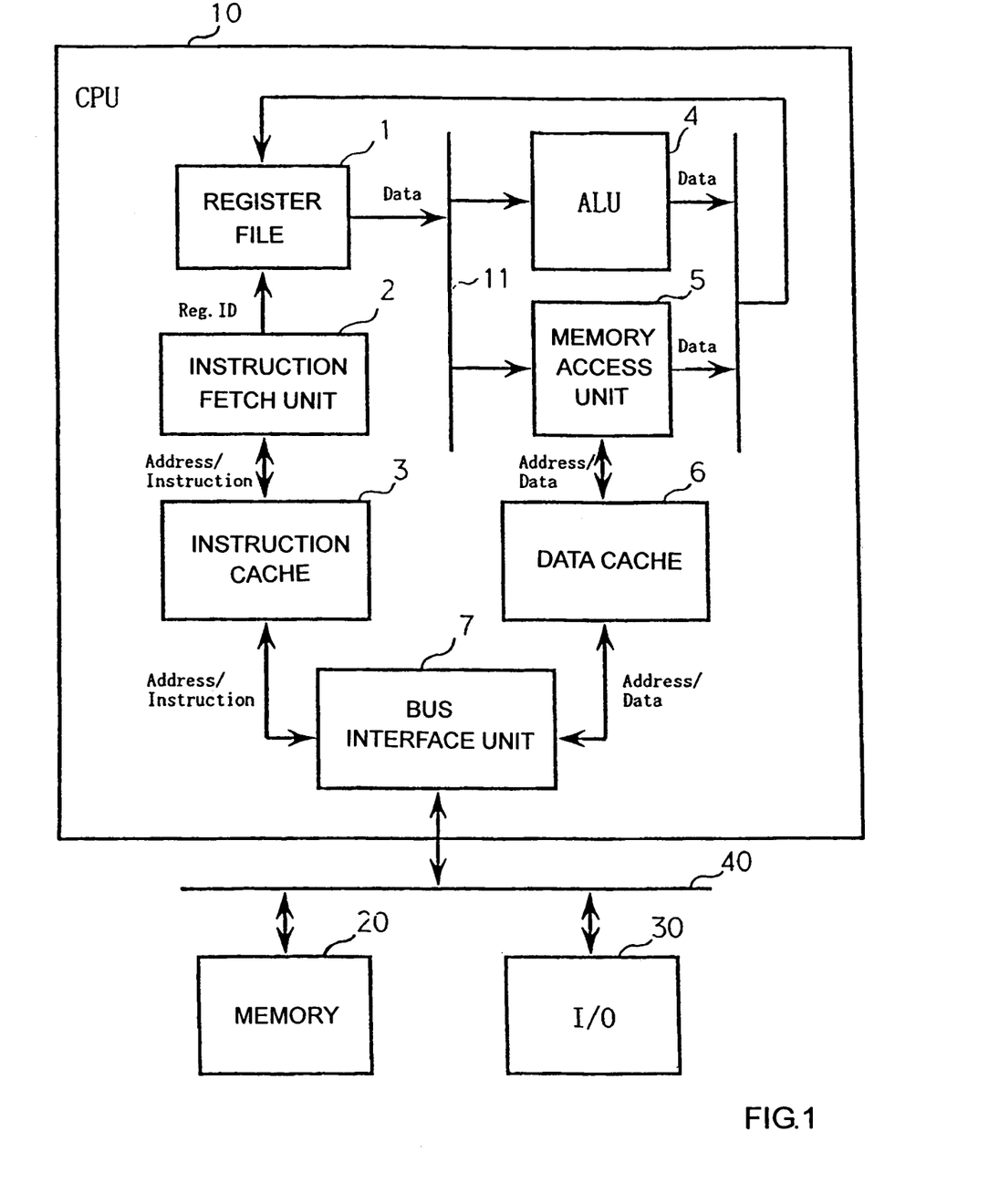
FIG. 1 is a view showing the configuration of a computer including a general CPU.

FIG. 1 is a view showing the configuration of a computer including a general CPU.

This computer includes a CPU 10, a memory 20, an input/output unit (I/O) 30, and a bus 40. The CPU 10 is connected to the memory 20, the I/O 30, and others, via the bus 40. The CPU 10 includes a register file 1, an instruction fetch unit 2, an instruction cache 3, an arithmetic logic unit (ALU) 4, a memory access unit 5, a data cache 6, a bus interface unit 7, and an arithmetic bus 11.

The register file 1 includes a general-purpose register (GPR), a floating-point register (FPR), a program counter (PC), a status register (SR), and other registers. The register file 1 stores a current context. The instruction cache 3 and the data cache 6 uses an SRAM, a flip-flop (FF), and other elements, and can process an access, a read, a write, and others at a high speed although the storage capacity is small. The memory 20 outside the CPU 10 uses an SDRAM, a DRAM, and other elements, and can process an access, a read, a write, and others at a lower speed than the cache, although the storage capacity is large.

The ALU 4 uses necessary data and a necessary instruction from the instruction cache 3, the data cache 6, or the memory 20, in accordance with the principle of locality. If the instruction cache 3 or the data cache 6 has an instruction and data needed for processing, the ALU 4 uses the instruction and the data. If not, the ALU 4 accesses the memory 20 to obtain a necessary instruction or data. The bus interface unit 7 is a unit for connecting the instruction cache 3, the memory access unit 5, and the data cache 6 with the memory 20, the I/O 30, and others outside the CPU via the bus 40 and performing data input and output between the inside and the outside of the CPU. The arithmetic bus 11 is a bus, such as an arithmetic pipeline, for connecting the register file 1, the ALU 4, and the memory access unit 5 in parallel.

The instruction fetch unit 2 outputs an address to the instruction cache 3, fetches an instruction from the instruction cache 3, and decodes the instruction. The ALU 4 reads a necessary operand from the register file 1 in accordance with the decoded instruction. The ALU 4 performs an arithmetic operation accordingly and writes the result of the arithmetic operation back into the register file 1. If a memory access instruction such as load and store is given, the memory access unit 5 reads an operand in accordance with the decoded instruction.

The memory access unit 5 accesses the data cache 6 and performs a load operation or a store operation. When a store instruction is given, the memory access unit 5 sends an address and data to the data cache 6 and stores the data in the data cache 6. When a load instruction is given, the memory access unit 5 sends an address to the data cache 6 and reads data from the data cache 6. The read data is written back into the register file 1. If necessary data cannot be found in the data cache 6, the data is read from the memory 20.

In this general configuration, a context stored in the register file 1 is saved by means of a store instruction.

Figure 2:
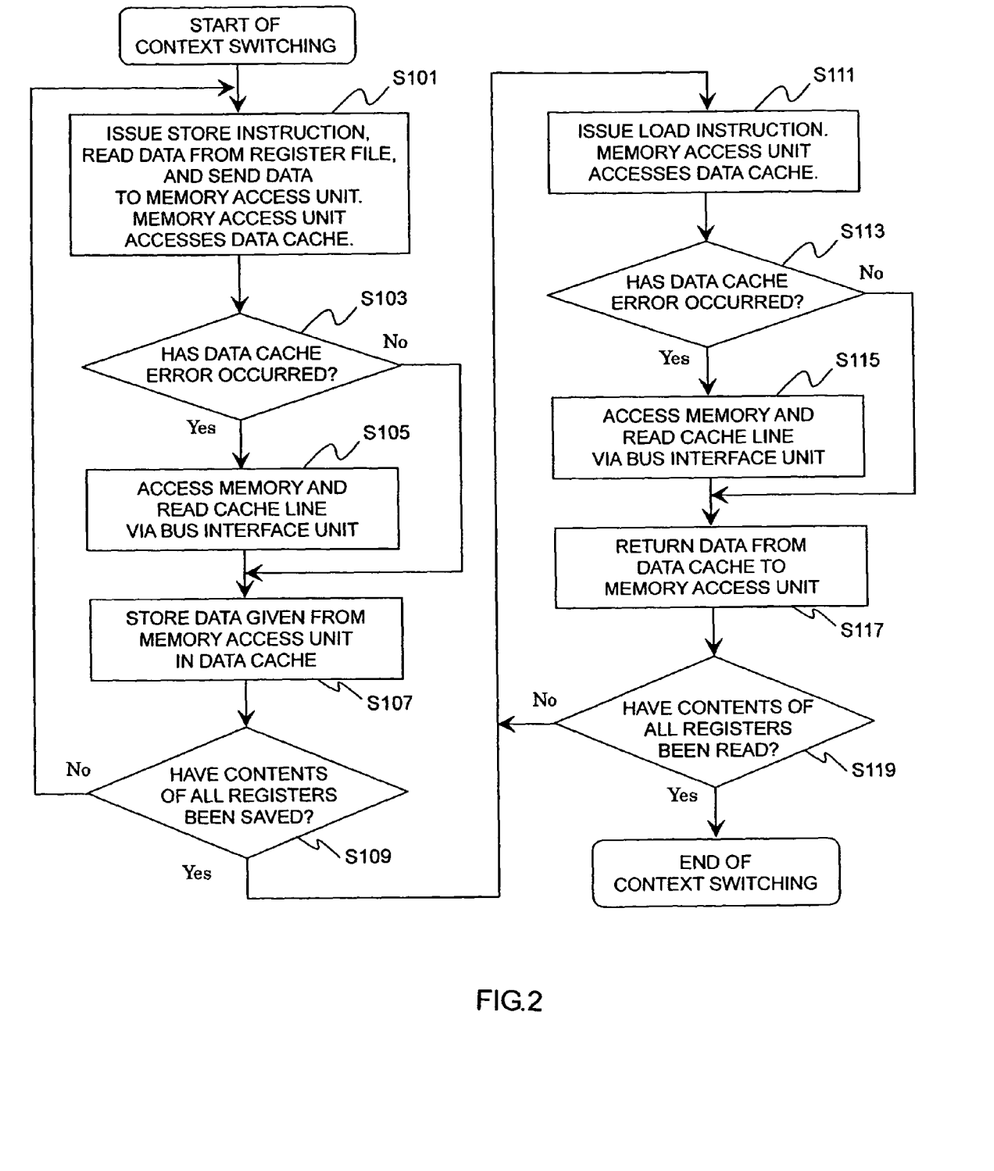
FIG. 2 is a flow chart of context switching by the general CPU.

FIG. 2 is a flow chart of context switching by the general CPU.

Software, such as an OS, issues a store instruction and starts context switching. When the store instruction is issued, data is read from the register file 1 and sent to the memory access unit 5. The memory access unit 5 calculates a data storage address and accesses the data cache 6 (S101). If a data cache error occurs (S103), the data cache 6 reads a cache line from the memory 20 (S105). If no data cache error occurs (S103), the processing proceeds to step S107. The data cache 6 stores the data sent from the memory access unit 5 at an appropriate address in it (S107). The software, such as an OS, repeats the processing of the store instruction as many times as the number of registers to be saved. Until the contents of all the registers are saved, the processing is repeated back from step S101. When the contents of all the registers are saved, the processing proceeds to step S111 (S109).

Then, the software, such as an OS, uses a load instruction to restore a new context to be executed. After the current context is saved, the software, such as an OS, issues a load instruction. When the load instruction is issued, the memory access unit 5 calculates a data read address and accesses the data cache 6 (S111). If a data cache error occurs (S113), the data cache 6 reads a cache line from the memory 20 (S115). If no data cache error occurs (S113), the processing proceeds to step S117. When data is returned from the data cache 6 (S117), the memory access unit 5 writes the data back into the register file 1. The load instruction is processed as many times as the number of registers to be restored. When the contents of all the registers are not read, the processing is repeated back from step S111. When the contents of all the registers are read, context switching ends (S119).

2. CPU Provided with Context Switching Unit

Figure 3:
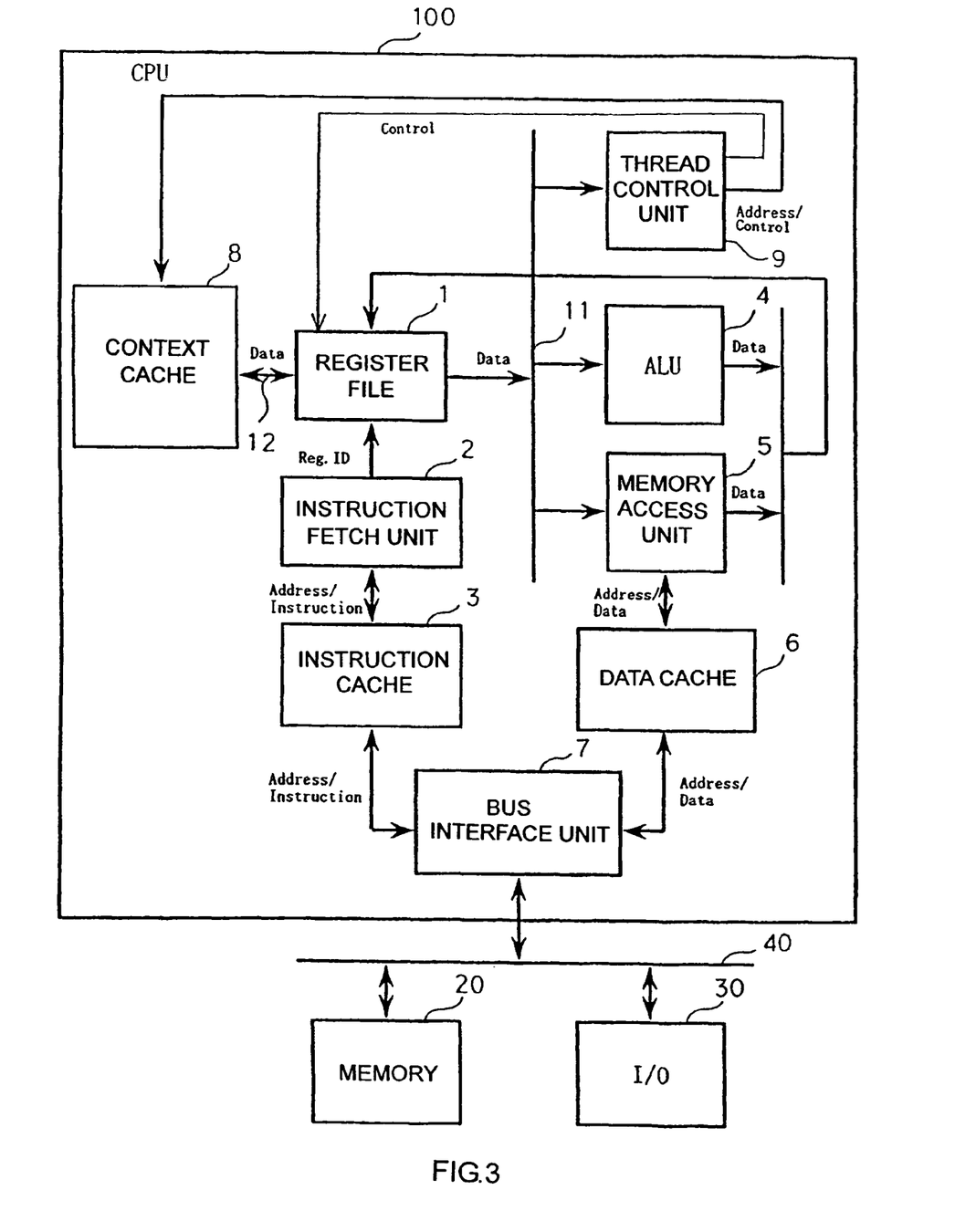
FIG. 3 is a view showing the configuration of a computer including a CPU which uses a context cache.

FIG. 3 is a view showing the configuration of a computer including a CPU which uses a context cache.

The CPU 100 includes a register file 1, an instruction fetch unit 2, an instruction cache 3, an ALU 4, a memory access unit 5, a data cache 6, a bus interface unit 7, a context cache 8, a thread control unit 9, an arithmetic bus 11, and a context bus 12. The arithmetic bus 11 is a bus, such as an arithmetic pipeline, for connecting the register file 1, the ALU 4, the memory access unit 5, and the thread control unit 9 in parallel. The configuration and operation of each block denoted by the same reference numeral as in the CPU 10 shown in FIG. 1 are as described earlier.

The context cache 8 uses a SRAM, a FF, and other elements, and can process an access, a read, a write, and others at a high processing speed. The context cache 8 is connected to the register file 1 via the context switching bus 12, and is used to cache a context. The thread control unit 9 is a unit for controlling the context cache 8 and is connected in parallel with the ALU 4 and the memory access unit 5. A thread generally means a processing unit or the smallest unit into which a process or a task is divided when the OS performs parallel processing of processes or tasks. Some processes or tasks may not be divided, and one process or one task may become one thread. When a context switch occurs, the context (a general-purpose register, a floating-point register, a program counter, a status register, and others) of the current thread must be saved, and the context of a new thread to be executed must be restored. When the context cache 8 of the present embodiment is used for context switching, contexts are saved and restored by means of a swap instruction for interchanging the data of the register file 1 and the context cache 8 via the context switching bus 12.

Figure 4:
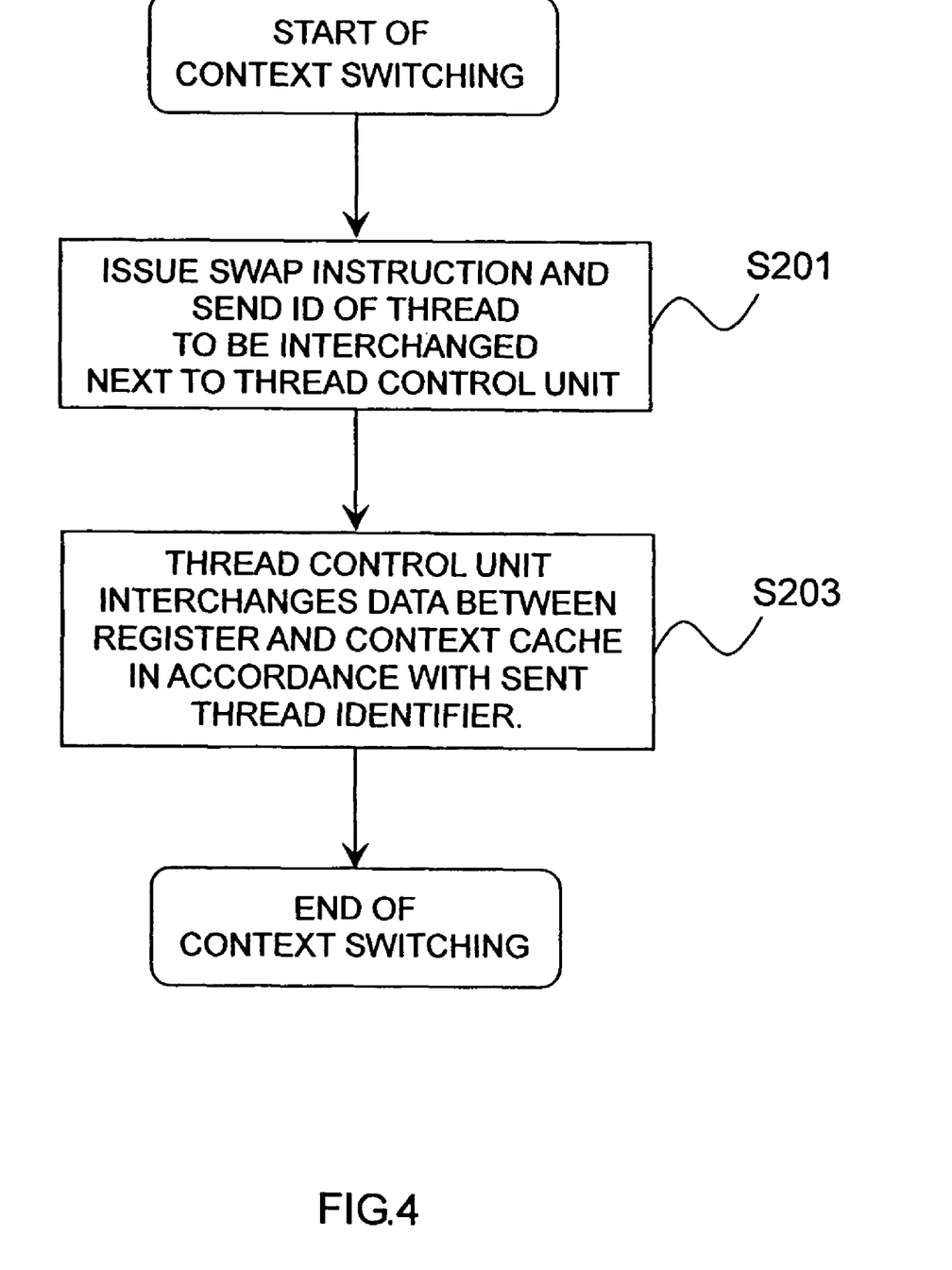
FIG. 4 is a flow chart of context switching by the CPU which uses the context cache.

FIG. 4 is a flow chart of context switching by the CPU which uses the context cache.

Software, such as an OS, issues a swap instruction and starts context switching. The swap instruction is given to the thread control unit 9, together with the identifier (ID) of the thread to be interchanged (S201). The thread ID is used to identify a thread stored in the context cache 8. The thread control unit 9 saves data from the register file 1 to the context cache 8 via the context switching bus 12 while sending the data of the new thread from the context cache 8 to the register file 1 concurrently. The thread control unit 9 automatically interchanges the data of the register file 1 and the data of the context cache 8 as much as needed in accordance with the sent thread ID (S203). Once the software, such as an OS, issues a swap instruction, the special hardware performs and finishes the context switching.

3. Details of Context Switching Unit

Figure 5:
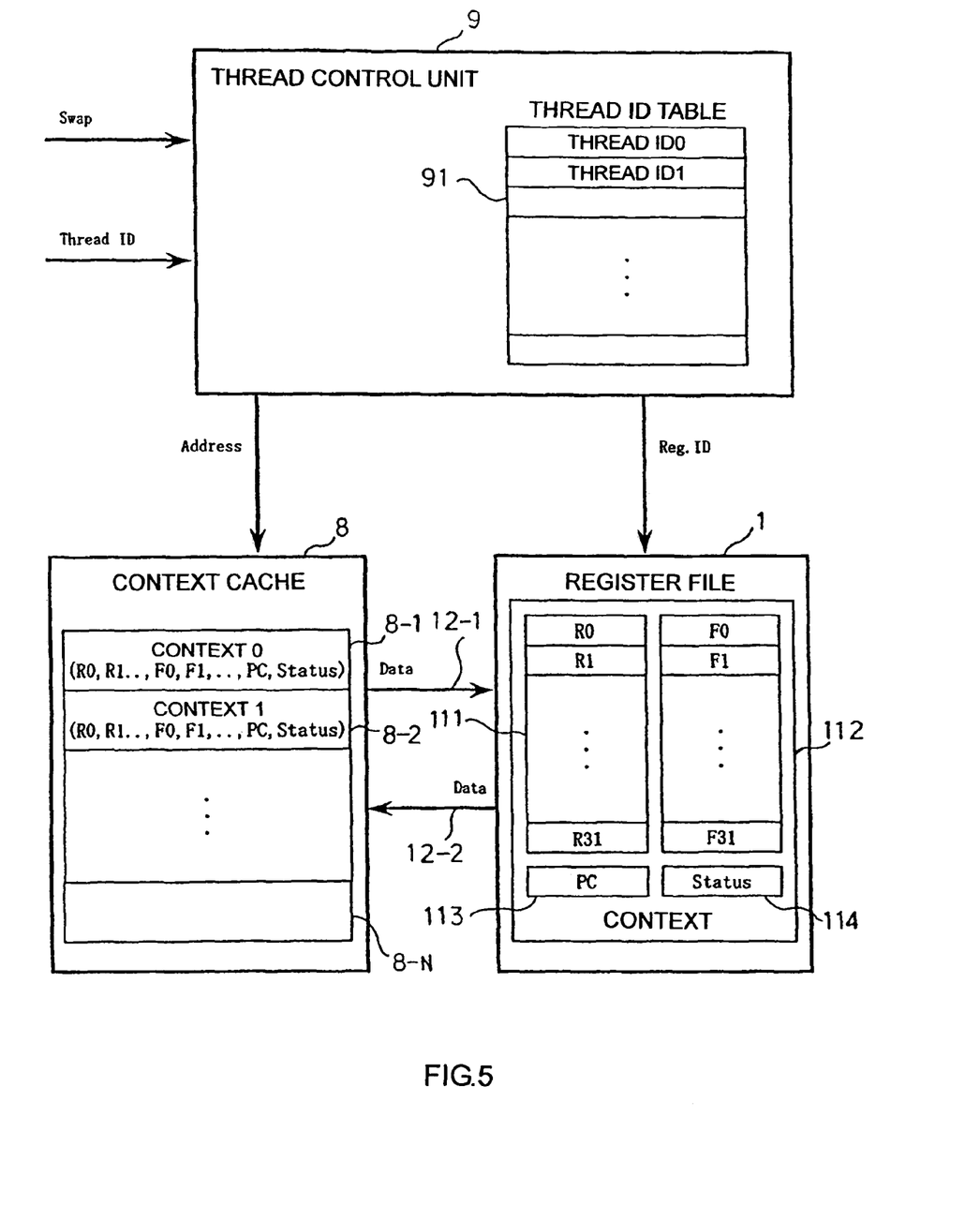
FIG. 5 is a view showing a detailed configuration of a context switching unit.

FIG. 5 is a view showing a detailed configuration of a context switching unit.

The register file 1 includes general-purpose registers 111, floating-point registers 112, a program counter 113, and a status register 114. The context cache 8 includes a given number of context storage areas 8-1, 8-2, . . . 8-n for storing a given number of contexts. The thread control unit 9 is a controller for controlling the context cache 8 and the register file 1 formed on an identical chip. The thread control unit 9 contains a thread ID table 91 for holding a given number of thread IDs for identifying the contexts stored in a on-chip memory. A multi-thread processor has a plurality of register files 1 arranged in parallel.

Figure 6:
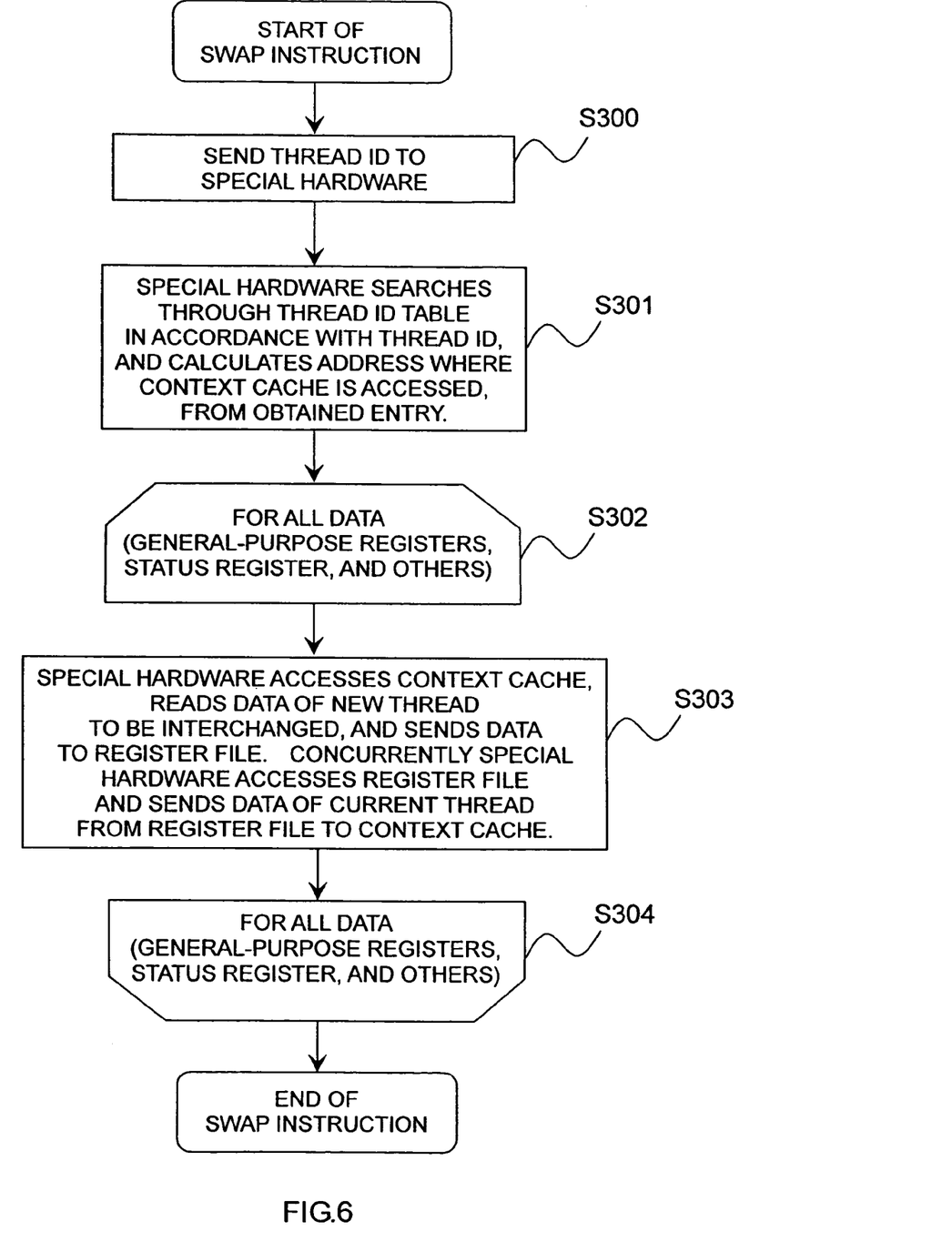
FIG. 6 is a flow chart of the processing of a swap instruction.

FIG. 6 is a flow chart of the processing of a swap instruction.

Context switching can be performed by using a special context switch instruction in a context switch handler, for instance. When software, such as an OS, issues a swap instruction, the thread control unit 9, which is special hardware, receives the swap instruction and a thread ID (S300). The thread control unit 9 searches through the thread ID table 91 in accordance with the thread ID, calculates an address where the data (context) of the thread to be interchanged is stored, as an access location of the context cache, and calculates a register ID as an access location of the register file 1 (S301). A loop of steps S302 to S304 is repeated for the data of all contexts (the general-purpose registers, the status register, and the others). The thread control unit 9 accesses the context cache 8 in accordance with the calculated address, reads the data (context) of the thread to be interchanged, and writes the data in the register file 1 (S303). At the same time or in parallel, the thread control unit 9 accesses the register file 1, reads the data (context) of the current thread, and writes the data in the context cache 8 (S303). The data is now interchanged between the register file 1 and the context cache 8. Until all the data is interchanged (S304), the thread control unit 9 increments the address of the context cache 8 to be accessed and the register ID of the register file 1 to be accessed by one and repeats the processing back from the step S303 (loop of steps S302 to S304). When all the data is interchanged (S304), the processing of the swap instruction ends.

The thread control unit 9 interchanges as much data as needed by incrementing the addresses of the context cache 8 and the register file 1 successively. The context switch operation, which requires several hundreds to one thousand and several hundreds of clock cycles if a load instruction and a store instruction are used, can be completed just in one to several clock cycles according to the present embodiment because the context switching bus 12 between the register file 1 and the context cache 8 has a data transfer width much greater than the bit width of the register. To be more specific, a group of registers is handled as a single large register, and each large register is given a register ID. If all registers are handled as one large register, a context switch operation can be completed in a single clock cycle.

The thread control unit 9 processes a backup instruction for saving a context and a restore instruction for restoring a context, as well as a swap instruction for interchanging contexts. When a backup instruction is given, the context data is not transferred from the context cache 8 to the register file 1, and the context data is transferred just from the register file 1 to the context cache 8. When a restore instruction is given, the context data is not transferred from the register file 1 to the context cache 8, and the context data is transferred just from the context cache 8 to the register file 1.

Figure 7:
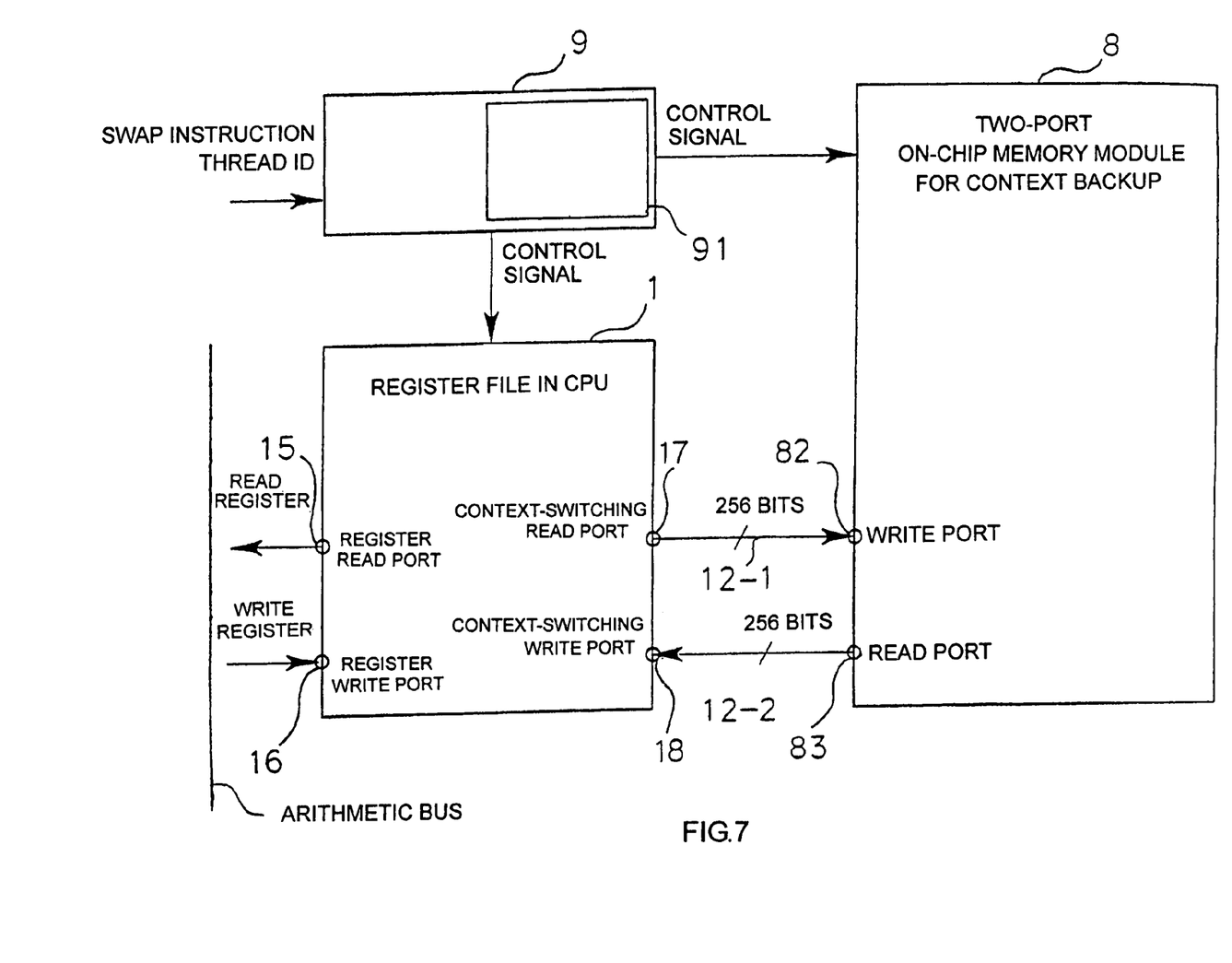
FIG. 7 is a view showing the implementation of the context switching unit.

FIG. 7 is a view showing the implementation of the context switching unit.

The context cache 8 is an on-chip memory provided for context backup, and the context cache 8 of the shown embodiment has two ports and is contained in the CPU. The shown context cache 8 has a write port 82 and a read port 83. The context cache 8 can contain storage areas for a given number of contexts (such as 32 contexts).

The register file 1 has a normal read port, a normal write port, and also special ports for context switching, which are a context-switching read port 17 and a context-switching write port 18, and a storage unit for holding a context is connected to these ports. In the shown embodiment, the register file 1 has a register read port 15, a register write port 16, the context-switching read port 17, and the context-switching write port 18. The register read port 15 is a port for reading a register from the register file 1 to a unit in the CPU; the register write port 16 is a port for writing a register from a unit in the CPU to the register file 1; the context-switching read port 17 is a port for reading a register from the register file 1 to the context cache 8; and the context-switching write port 18 is a port for writing a register from the context cache 8 to the register file 1.

When a context switch occurs, the software, such as an OS, issues a swap instruction, and the thread control unit saves data from the context cache 8 in the CPU to the register file 1 and fetches a new context from the register file 1, through the context-switching read port 17 and the context-switching write port 18. Context buses 12-1 and 12-2 connecting the register file 1 and the context cache 8 have a greater width than the bit width of the register file 1, so that a greater amount of data can be interchanged at one time. In the shown embodiment, the register file 1 and the on-chip context cache 8 are connected by the context switching buses 12-1 and 12-2 with a width of 256 bits each. A two-port on-chip memory can be used as the context cache 8, so that a read and a write can be carried out simultaneously. The context of 32 general-purpose registers each having 32 bits can be interchanged in four clock cycles.

The number of bits, the storage capacity, the number of ports, and other parameters given above are just a few examples, and can be specified appropriately.

4. Others

The context switching method or the context switching unit or system of the present invention can be implemented by a context switching program for executing each step by a computer, a computer-readable recording medium having recorded the context switching program, a program product which includes the context switching program and can be loaded into an internal memory of a computer, a computer, such as a server, including the program, and others.

INDUSTRIAL APPLICABILITY

According to the present invention, overhead caused by context switching can be substantially reduced, especially in an application involving frequent context switching, such as a real-time OS. The present invention can also provide a context switching method, a context switching unit, a central processing unit, and a computer-readable recording medium having recorded a context switching program which allow a memory access operation for storing a context and reading another context to be completed in one to several cycles at each context switch, for instance.

According to the present invention, the context switching time can be kept constant, and the time quantum of a real-time operation can be minimized, especially in a system involving frequent context switching, such as a real-time processing system.

The invention claimed is:

1. A context switching unit for switching a plurality of contexts, the context switching unit comprising:
   a register file having stored a context related to a thread to be executed by an arithmetic logic unit or a memory access unit, the register file comprising a register read port, a register write port, a context-switching read port, and a context-switching write port;
   a context cache used exclusively for saving and restoring contexts, the context cache comprising a read port and a write port, being connected directly to the register file and integrated in a central processing unit on a chip, the context cache being not connected to a memory through a bus, which connects the memory, an instruction cache and a data cache to each other, and being independent from a memory system including the memory, the instruction cache and the data cache, to realize context switching at a high processing speed without interference from the bus;
   a context switching bus for connecting the register file and the context cache, the context switching bus comprising a restore bus and a save bus for connecting the read port and the write port of the context cache to the context-switching write port and the context-switching read port of the register file respectively; and
   a thread control unit for controlling data transfer between the context cache and the register file, the thread control unit comprising a thread identifier table for storing a thread identifier for identifying the context of a thread stored in the context cache and being connected in parallel with the arithmetic logic unit and the memory access unit, wherein, in case of a context switch operation which executes both a save operation for saving a context from the register file to the context cache and a restore operation for restoring a context from the context cache to the register file in parallel at the same time, the thread control unit receives a context switch instruction for executing the context switch operation with the identifier of a new thread to be interchanged;

the thread control unit obtains a restore address where a new context to be interchanged is stored in the context cache and a save register identifier indicating a location where a current context is stored in the register file, by searching through the thread identifier table in accordance with the thread identifier;

the thread control unit sends the obtained address to the context cache and the register identifier to the register file;

in parallel at the same time;

the register file, in accordance with the register identifier given by the thread control unit, outputs the data of the context to be saved from the context-switching read port to the save bus for the save operation and holds the data of the context to be in parallel at the same time, sent from the read port of the context cache to the context-switching write port through the restore for the restore operation;

the context cache, in accordance with the address given by the thread control unit, outputs the data of a context to be restored from the read port to the restore bus for the restore operation and holds the data of the context to be saved in parallel at the same time, sent from the context-switching read port of the register file to the write port via the save bus for the save operation; and whereby the context switching unit switches contexts the context switch operation which executes both the restore operation and the save operation in parallel at the same time.

2. The context switching unit according to claim 1, wherein the context switching bus has a bus width greater than a bit width of the register file.

3. The context switching unit according to claim 1, wherein the thread control unit comprises as many thread identifier tables as required to identify contexts cached in the context cache.

4. The context switching unit according to claim 1, wherein the thread control unit saves the context of the current thread from the register file to the context cache and sends the context of a new thread from the context cache to the register file in parallel at the same time to automatically interchange a required number of data items between the register file and the context cache, when software, such as an operating system, issues a swap instruction for interchanging contexts, including a thread identifier as an operand, if the swap instruction is executed.

5. The context switching unit according to claim 1, wherein the thread control unit transfers the data of a context from the register file to the context cache and does not transfer the data of a context from the context cache to the register file, when software, such as an operating system, issues a backup instruction for saving a context, including a thread identifier as an operand, if the backup instruction is executed.

6. The context switching unit according to claim 1, wherein the thread control unit transfers the data of a context from the context cache to the register file and does not transfer the data of a context from the register file to the context cache, when software, such as an operating system, issues a restore instruction for restoring a context, including a thread identifier as an operand, if the restore instruction is executed.

7. A central processing unit comprising:

a context switching unit according claim 1;

the instruction cache for caching an instruction and the data cache for caching data;

an instruction fetch unit for fetching the instruction from the instruction cache and decoding the instruction;

the memory access unit for accessing the data cache and memory, and executing a load or store operation; and an arithmetic bus for connecting the register file, the arithmetic logic unit, the memory access unit, and the thread control unit in parallel.

8. The central processing unit according to claim 7, wherein the memory access unit sends an address and data to the data cache and stores the data in the data cache when a store instruction is given, and the memory access unit sends an address to the data cache, reads data from the data cache, and writes the read data back into the register file when a load instruction is given.

9. A context switching method for switching a plurality of contexts by using a context switching unit comprising:

storing a context related to a thread in a register file to be executed by an arithmetic logic unit or a memory access unit, the register file comprising a register read port, a register write port, a context-switching read port, and a context-switching write port;

saving and restoring contexts exclusively in a context cache, the context cache comprising a read port and a write port, being connected directly to the register file and integrated in a central processing unit; on a chip, the context cache being not connected to a memory through a bus, which connects the memory, an instruction cache and a data cache to each other, and being independent from a memory system including the memory, the instruction cache and the data cache, to realize context switching at a high processing speed without interference from the bus;

connecting the register file and the context cache with a context switching bus, the context switching bus comprising a restore bus and a save bus for connecting the read port and the write port of the context cache to the context-switching write port and the context-switching read port of the register file respectively; and controlling data transfer between the context cache and the register file using a thread control unit, the thread control unit comprising a thread identifier table for storing a thread identifier for identifying the context of a thread stored in the context cache and being connected in parallel with the arithmetic logic unit and the memory access unit, wherein, in case of a context switch operation which executes both a save operation for saving a context from the register file to the context cache and a restore operation for restoring a context from the context cache to the register file in parallel at the same time, the thread control unit receives a context switch instruction for executing the context switch operation with the identifier of a new thread to be interchanged;

the thread control unit obtains a restore address where a new context to be interchanged is stored in the context cache and a save register identifier indicating a location where a current context is stored in the register file, by searching through the thread identifier table in accordance with the thread identifier;

the thread control unit sends the obtained address to the context cache and the register identifier to the register file in parallel at the same time;
the register file, in accordance with the register identifier given by the thread control unit, outputs the data of the context to be saved from the context-switching read port to the save bus for the save operation and holds the data of the context to be restored in parallel at the same time, sent from the read port of the context cache to the context-switching write port through the restore bus for the restore operation;
the context cache, in accordance with the address given by the thread control unit, outputs the data of the context to be restored from the read port to the restore bus for the restore operation and holds the data of the context to be saved in parallel at the same time, sent from the context-switching read port of the register file to the write port via the save bus; for the save operation; and
whereby the context switching unit switches contexts by the context switch operation which executes both the restore operation and the save operation in parallel at the same time.

10. The context switching method according to claim 9, saving the context of the current thread from the register file to the context cache and sending the context of a new thread from the context cache to the register file concurrently to automatically interchange a required number of data items between the register file and the context cache, when software, such as an operating system, issuing a swap instruction for interchanging contexts, including a thread identifier as an operand, if the swap instruction is executed.

11. The context switching method according to claim 9, transferring the data of a context from the register file to the context cache and not transferring the data of a context from the context cache to the register file, when software, such as an operating system, issuing a backup instruction for saving a context, including a thread identifier as an operand, if the backup instruction is executed.

12. The context switching method according to claim 9, transferring the data of a context from the context cache to the register file and not transferring the data of a context from the register file to the context cache, when software, such as an operating system, issuing a restore instruction for restoring a context, including a thread identifier as an operand, if the restore instruction is executed.

13. A computer comprising a context switching program for switching a plurality of contexts by using a context switching unit the context switching unit comprising:
  a register file having stored a context related to a thread to be executed by an arithmetic logic unit or a memory access unit, the register file comprising a register read port, a register write port, a context-switching read port, and a context-switching write port;
  a context cache used exclusively for saving and restoring contexts, the context cache comprising a read port and a write port, connected directly to the register file and integrated in a central processing unit on a chip, the context cache being not connected to a memory through a bus, which connects the memory, an instruction cache and a data cache to each other, and being independent from a memory system including the memory, the instruction cache and the data cache, to realize context switching at a high processing speed without interference from the bus;
  a context switching bus for connecting the register file and the context cache, the context switching bus comprising a restore bus and a save bus for connecting the read port and the write port of the context cache to the context-switching write port and the context-switching read port of the register file respectively; and
  a thread control unit for controlling data transfer between the context cache and the register file, the thread control unit comprising a thread identifier table for storing a thread identifier for identifying the context of a thread stored in the context cache and being connected in parallel with the arithmetic logic unit and the memory access unit,
the context switching program causing the computer to execute:
a step wherein, in case of a context switch operation which executes both a save operation for saving a context from the register file to the context cache and a restore operation for restoring a context from the context cache to the register file in parallel at the same time, the thread control unit receives a context switch instruction for executing the context switch operation with the identifier of a new thread to be executes both a context save operation and a context restore operation in interchanged;
a step in which the thread control unit obtains a restore address where a new context to be interchanged is stored in the context cache and the save register identifier indicating the location where the current context is stored in the register file, by searching through the thread identifier table in accordance with the thread identifier;
a step in which the thread control unit sends the obtained address to the context cache and the register identifier to the register file in parallel at the same time;
a step in which the register file, in accordance with the register identifier given by the thread control unit, outputs the data of the context to be saved from the context-switching read port to the save bus for the save operation and holds the data of the context to be restored in parallel at the same time, sent from the read port of the context cache to the context-switching write port through the restore bus for the restore operation in the register corresponding to the register identifier;
a step in which the context cache, in accordance with the address given by the thread control unit, outputs the data of the context to be restored from the read port to the restore bus for the restore operation and holds the data of the context to be saved in parallel at the same time, sent from the context-switching read port of the register file to the write port via the save bus for the save operation; and
whereby the context switching unit switches contexts by the context switch operation which executes both the restore operation and the save operation in parallel at the same time.

* * * * *